(12) United States Patent
Shih et al.

(10) Patent No.: US 8,727,209 B1
(45) Date of Patent: May 20, 2014

(54) VERIFYING SYSTEM AND METHOD THEREOF

(71) Applicant: dadny Inc., Taipei (TW)

(72) Inventors: Daniel Shih, Taipei (TW); Ching-Yi Wu, Hsinchu (TW)

(73) Assignee: dadny, Inc., Taipei (TW)

( * ) Notice: Subject to any disclaimer, the term of this patent is extended or adjusted under 35 U.S.C. 154(b) by 0 days.

(21) Appl. No.: 13/871,219

(22) Filed: Apr. 26, 2013

(30) Foreign Application Priority Data

Dec. 26, 2012 (TW) .............................. 101150283 A

(51) Int. Cl.
*G06F 17/00* (2006.01)
(52) U.S. Cl.
USPC ............................ 235/375; 235/380; 283/102
(58) Field of Classification Search
USPC .................................. 235/375, 380; 283/102
See application file for complete search history.

(56) References Cited

U.S. PATENT DOCUMENTS

| | | | | |
|---|---|---|---|---|
| 6,308,991 B1* | 10/2001 | Royer | ........................... | 283/102 |
| 7,530,570 B2* | 5/2009 | Nulph et al. | ................... | 273/139 |
| 2009/0165343 A1* | 7/2009 | Miller et al. | ............... | 40/124.06 |
| 2013/0269865 A1* | 10/2013 | Drinkwater | .................... | 156/234 |

FOREIGN PATENT DOCUMENTS

TW  M423879 U1  3/2012

* cited by examiner

*Primary Examiner* — Allyson Trail
(74) *Attorney, Agent, or Firm* — Wang Law Firm, Inc.; Li K. Wang; Stephen Hsu

(57) ABSTRACT

A verifying system includes an object to be verified and a verifying end. The object to be verified includes an identifying code covered with a one-time removable and opaque shielding layer, and an object tag is disposed on the shielding layer, the object tag corresponding to the identifying code. The verifying end includes a database storing object information corresponding to the identifying code. After the shielding layer is removed to expose the identifying code, and an electronic device is utilized to read the identifying code, the electronic device connects to the verifying end in accordance with the identifying code, so that the verifying end compares the identifying code with the object information, so as to generate a verifying information and transmit the verifying information to the electronic device.

8 Claims, 9 Drawing Sheets

VERIFYING SYSTEM AND METHOD THEREOF

CROSS-REFERENCE TO RELATED APPLICATION

This application claims the benefit of Taiwan Patent Application No. 101150283, filed on Dec. 26, 2012, in the Taiwan Intellectual Property Office, the disclosure of which is incorporated herein in its entirety by reference.

BACKGROUND OF THE INVENTION

1. Field of the Invention

The present invention generally relates to a verifying system and the method thereof, in particular to a verifying system and the method thereof which disposes a verifying tag on an object, such that an electronic device may perform a verifying process on the verifying tag to confirm the authenticity of the object.

2. Description of the Related Art

With the continuous improvement of technology, the technique for manufacturing product crafts is also advancing. Therefore, counterfeiting techniques also become more clever, such that some illegal maker manufactures counterfeits with the counterfeit technique and sells the counterfeits in the markets. And it becomes more and more difficult for customers to identify the authenticity of the goods while they are shopping. For the reason of allowing the consumers to identify whether the goods are counterfeit or genuine, the producers continuously improve the anti-counterfeit identification mechanism but the cost of production is also increased.

In addition, after performing much research, the developers of the genuine products are compelled to share the achievements with illegal makers. Thus, some developers of the genuine products gradually give up developing new products, which affects the development of each industry in operation. Furthermore, if illegal makers use inferior materials in the manufacture of counterfeit food, it might cause instant harm to the bodies of customers. For example, in various adulterated liquor incidents, the counterfeiters produce adulterated liquor with inedible industrial alcohol, and then sell the adulterated liquor to consumers, such that the consumers drink the toxic industrial alcohol which may cause hazard of life.

Therefore, some manufacturers focus on anti-counterfeit technique, for example, the Taiwanese patent No. M423879 "An anti-counterfeit system using barcodes to identify the products" discloses printing the product serial number in the form of a text or a barcode on the package or the label. And an electronic device with network connectivity is utilized to execute an anti-counterfeit and verifying program and is connected to a program module at the verifying end through the network, so as to receive a verifying serial number and connect to a central module at a database for performing a verifying process and receiving a report.

According to the above description, there are still several drawbacks in the prior art yet. For example, the product serial number is directly disposed on the outward or the outer surface of the product in the form of the text or the barcode in prior art. This condition may cause the real consumer or the user to receive an error message because people may perform the verifying process without authority. And if the verifying process cannot be performed until using the program provided from the manufacturer or the verifying end, this requisite might cause trouble or inconvenience to the customer or the user. On the other hand, if the illegal maker counterfeits the product serial number, the verifying end still has to perform a comparison process or a verifying process one by one. This condition imposes a heavy burden on the verifying end.

Hence, in order to prevent people from performing the verifying process without authority, some manufacturers start disposing the identifying code inside the packing box of the goods or inside the goods. For example, the manufacturer may dispose the identifying code inside the cap of the wine bottle or beverage bottle, or print the identifying code inside the packing box of the goods. Although this method could prevent other people from using the electronic device to read the identifying code and perform the verifying process before buying the goods, verification requires opening or unwrapping the packaging of the goods to acquire the identifying code. The method causes great inconvenience.

As set forth above, the inventor of the present invention designs a verifying system and the method thereof to improve the deficiency of the existing manners for promoting the utilization of the industry.

SUMMARY OF THE INVENTION

Therefore, it is a primary objective of the present invention to provide a verifying system and the method thereof to overcome the deficiency of the existing method wherein identification of product authenticity is difficult.

To achieve the foregoing objective, the present invention provides a verifying system comprising an object to be verified and a verifying end. The object to be verified includes an identifying code covered with a one-time removable and opaque shielding layer, and an object tag is disposed on the shielding layer, the object tag is corresponding to the identifying code. The verifying end includes a database storing object information corresponding to the identifying code. After the shielding layer is removed to expose the identifying code, and an electronic device is utilized to read the identifying code, the electronic device connects to the verifying end in accordance with the identifying code, so that the verifying end compares the identifying code with the object information, so as to generate a verifying information and transmit the verifying information to the electronic device.

Preferably, when the identifying code is matched to object information, the verifying may further store paired information in the object information, and when the identifying code is read again, the verifying end may generate the verifying information encompassing the paired information and transmit the verifying information to the electronic device.

Preferably, the identifying code may include an encrypted information and an internet address, the electronic device may recognize the internet address from the identifying code, so as to connect to the verifying end in accordance with the internet address, and the verifying end may determine whether to perform a comparison process on the object to be verified based on the encrypted information, and if so, the verifying end may compare the identifying code with the object information, and then generate the verifying information, otherwise the verifying end may generate the verifying information directly.

Preferably, the verifying information may include a reporting link, and after the electronic device receives the verifying information, the electronic device may selectively transmit the reporting information to the verifying end in accordance with the reporting link.

Preferably, the object to be verified may further include a packaging unit covering on a body of the object to be verified, the identifying code may be disposed on an external surface of the packaging unit or on the body of the object to be verified.

To achieve the foregoing objective, the present invention further provides a verifying method comprising the following steps of: disposing an identifying code and an one-time removable and opaque shielding layer on an object to be verified, the shielding layer covering the identifying code with an object tag corresponding to the identifying code being disposed thereon; providing a verifying end, including a database storing an object information corresponding to the identifying code; removing the shielding layer disposed on the object to be verified, so as to expose the identifying code; reading the identifying code by an electronic device, such that the electronic device connects to the verifying end in accordance with the identifying code; utilizing the verifying end to compare the identifying code with the object information, so as to generate a verifying information; and transmitting the verifying information to the electronic device by the verifying end.

Preferably, the verifying method further comprises the following steps of: utilizing the verifying end to confirm whether the identifying code matches the object information, and if so, the verifying end storing a paired information in the object information; utilizing the verifying end to generate the verifying information encompassing the paired information when the identifying code is read again; and transmitting the verifying information to the electronic device by the verifying end.

Preferably, the identifying code includes an interest address and an encrypted information, and the verifying method further comprises the following steps of: recognizing the internet address from the identifying code by the electronic device to connect to the verifying end in accordance to the internet address; and determining whether to perform a comparison process on the object to be verified based on the encrypted information by the verifying end, and if so, the verifying end generates the verifying information after the verifying end compares the identifying code with the object information, otherwise the verifying end generates the verifying information directly.

Preferably, the verifying information includes a reporting link, and the verifying method further comprises the following step of: transmitting reporting information selectively to the verifying end in accordance to the reporting link by the electronic device after the electronic device receives the verifying information.

Preferably, the object to be verified further includes a packaging unit, the verifying method further comprising the following step of: disposing the identifying code on an external surface of the packaging unit or on a body of the object to be verified; and covering the packaging unit on the body of the object to be verified.

As described above, the verifying system and the method thereof according to the present invention may have the following advantages:

(1) In the verifying system and the method thereof, an identifying code is disposed on an object and covers a one-time removable and opaque shielding layer on the identifying code, so as to provide users to acquire the identifying code from opening or disassembling the packaging of the goods, and allow the users to preliminary judge whether the identifying code was used by checking the shielding layer was removed or not, so as to decrease the probability that the identifying code is easily verified in maliciousness.

(2) The verifying system and the method thereof can improve the convenience of judging the authenticity of the goods by reading the identifying code.

(3) The verifying system and the method thereof can decrease the loading of the verifying end by setting encrypted information in the identifying code.

(4) The verifying system and the method thereof can improve the convenience of judging the authenticity of the goods by using the current definitive identifying program to perform the verifying process.

DETAILED DESCRIPTION OF THE PREFERRED EMBODIMENTS

Figure 1:
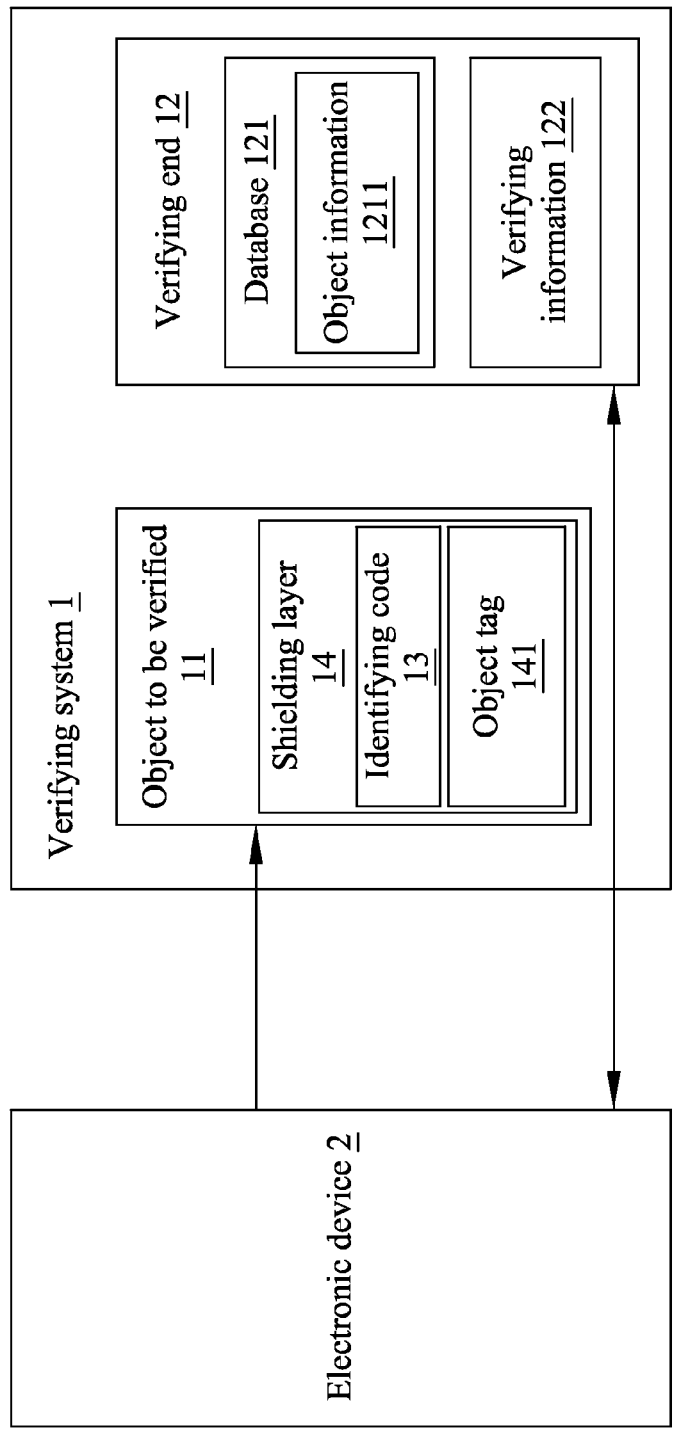
FIG. 1 is a block diagram of a first exemplary embodiment of the verifying system of the present invention.
Figure 2:
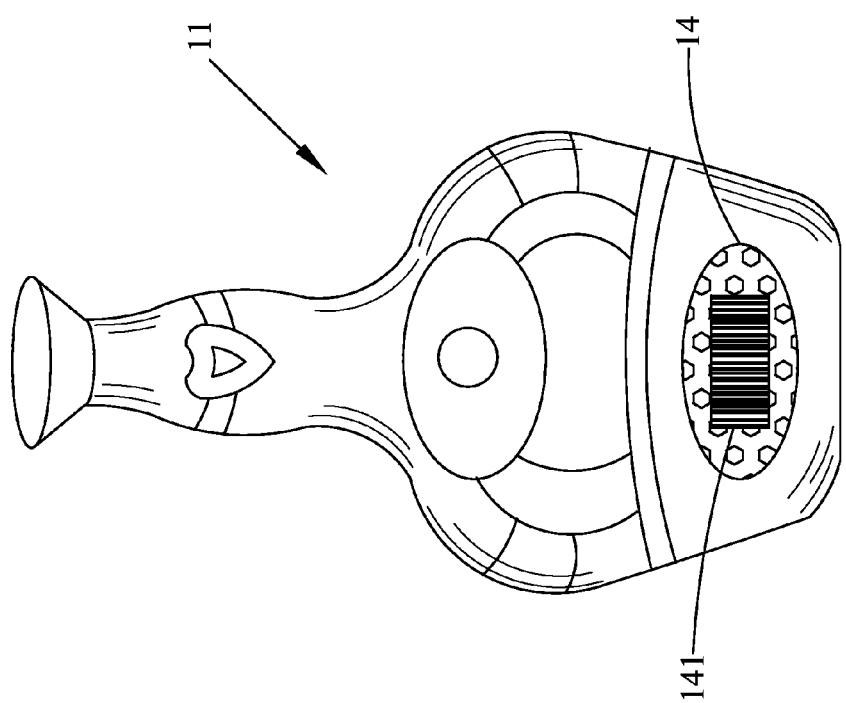
FIG. 2 is a first schematic diagram of a second exemplary embodiment of the verifying system of the present invention.

Hereinafter, the exemplary embodiments of the present disclosure will be described in detail with reference to the accompanying drawings. However, the scope of the present disclosure is not limited to the following exemplary embodiments and drawings.

For reference, respective components and shapes thereof were schematically drawn or exaggeratedly drawn in the accompanying drawings for easy understanding. Components that perform the same or similar functions are represented by the same reference numerals on the drawings.

With reference to FIG. 1 for a block diagram of a first exemplary embodiment of the verifying system of the present invention, the verifying system 1 includes an object to be verified 11 and a verifying end 12. An identifying code 13 which may be generated by an identifying code generator is disposed on the object to be verified 11. Furthermore, the identifying code 13 is covered with a one-time removable and opaque shielding layer 14, and an object tag 141 corresponding to the identifying code 13 is disposed on the shielding layer 14. The verifying end 12 includes a database 121, and object information 1211 corresponding to or matching the identifying code 13 is stored in the database 121.

It should be noted that, the shielding layer 14 may be a transparent layer and a silver lacquer layer, which is formed by covering the transparent layer on the identifying code 13 first, and then covering the silver lacquer layer on the transparent layer, so as to prevent the users scrape the identifying code 13 off while scraping the silver lacquer layer. Before the user utilizes the electronic device 2 to read the identifying code 13 disposed on the object to be verified 11, the user needs to scrape the silver lacquer layer covered on the identifying code 13 to expose the identifying code 13. Alternatively, the shielding layer 14 may be an opaque adhesive layer which is attaching on the identifying code 13 and shielding the identifying code 13. Before the user uses the electronic device 2 to read the identifying code 13 disposed on the object to be verified 11, the user needs to tear down the adhesive layer covered on the identifying code 13 to expose the identifying code 13. Alternatively, the shielding layer 14 may be a label or a sticker which is integrally formed with the identifying code 13. One side or opposite sides of the shielding layer 14 may not be fixed with the surface of the identifying code 13, so as to be more convenient for the user to tear down the shielding layer 14. And the rest side of the shielding layer 14 may be fixed with the surface of the identifying code 13, the fixed side of the shielding layer 14 may be fixed by using adhesive material to attach on the surface of the identifying code 13, or using a tearing line formed by dashed line to fix on the surface of the identifying code 13.

Furthermore, the object tag 141 disposed on the shielding layer 14 may be a product serial code, a product name or an image, but not limited thereto. The object tag 141 may be disposed on the shielding layer 14 by attaching or printing manner. By the way, since the shielding layer 14 and the identifying code 13 may be designed in the form of a single piece of label or sticker, the manufacturer does not need to purchase another apparatus to attaching the identifying code 13 while disposing the identifying code 13 on the goods in the manufacturing process. The manufacturer may use the original manufacture machine for attaching the shielding layer 14 having object tag 141 to attach the identifying code 13 on the object to be verified 11 while attaching the shielding layer 14. Also, using the same apparatus to attach the shielding layer 14 and the identifying code 13 on the object to be verified 11 at the same time could prevent the problem of mismatching the identifying code 13 and the object tag 141 disposed on the shielding layer 14.

Additionally, the electronic device 2 connects to the verifying end 12 and transmits the identifying code 13 to the verifying end 12 in accordance to the content provided from the identifying code 13. Meanwhile, the verifying end 12 compares the identifying code 13 with the object information and then generates verifying information 122 to the electronic device 2 in order to provide the verifying information 122 to the user. The user can then tell the authenticity of the object to be verified in accordance to the verifying information 122.

Further, referring to FIGS. 2 to 5 for the first schematic diagram to the fourth schematic diagram of a second exemplary embodiment of the verifying system of the present invention. In the present exemplary embodiment, the object to be verified 11 takes a wine bottle for example. Supplier disposes the identifying code 13 on an outside of the object to be verified 11, that is to say, the identifying code 13 is disposed on a label sticker of the outside of the wine bottle and a one-time removable and opaque shielding layer 14 is covered on the identifying code 13. After a user buys the object to be verified at a physical store or an online store, the user could scrape or tear down the shielding layer 14 and utilize the electronic device 2 to read the identifying code 13, so as to check whether the object to be verified 11 is belonging to the goods of the true supplier. Wherein, the electronic device 2 may be a mobile electronic device such as a smart phone, a personal digital assistant, a tablet computer, a notebook computer, but not limited thereto. The identifying code 13 may be one of the text, symbol, image, serial number, radio frequency identification code or the combination thereof, but not limited thereto. For example, the identifying code 13 may be a quick response code (QR code).

Figure 3:
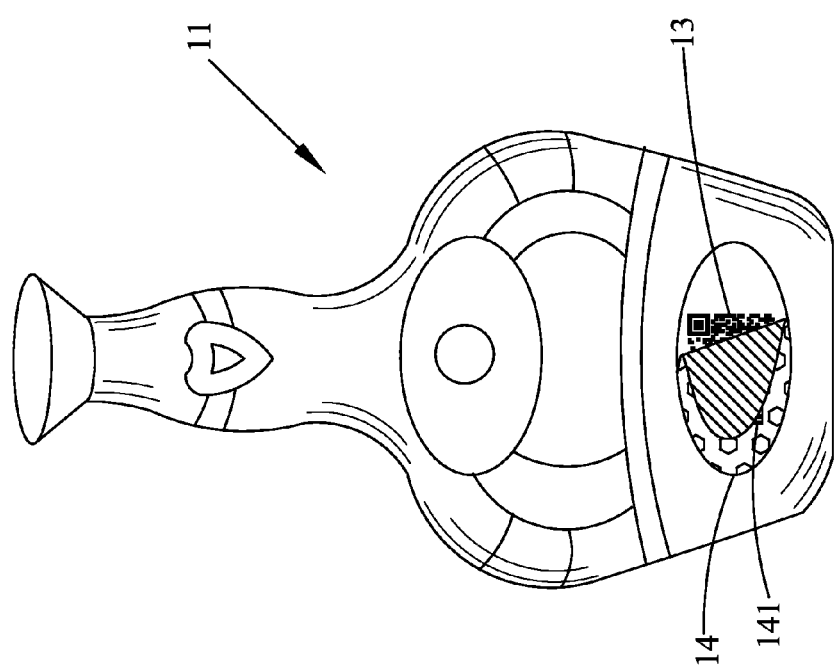
FIG. 3 is a second schematic diagram of the second exemplary embodiment of the verifying system of the present invention.
Figure 4:
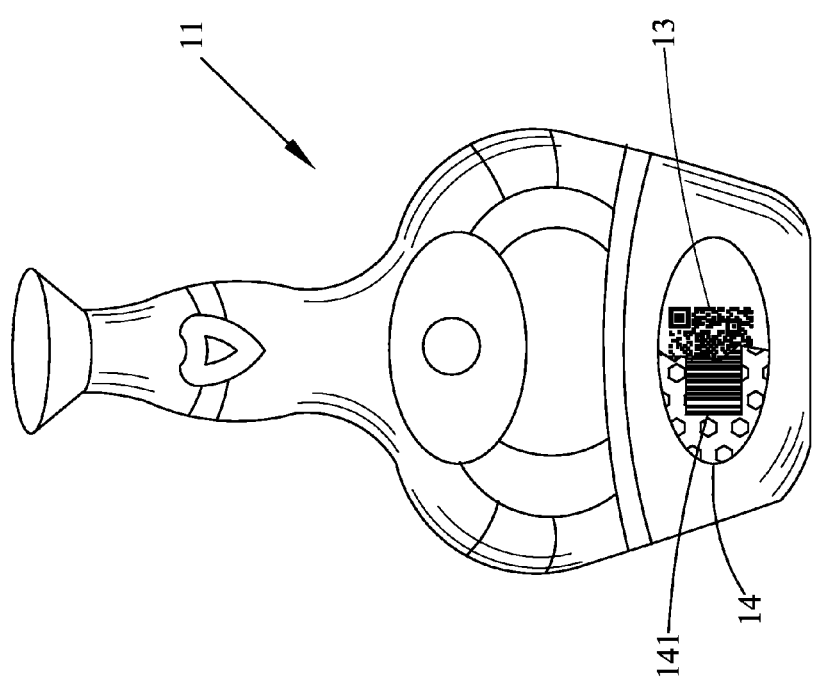
FIG. 4 is a third schematic diagram of the second exemplary embodiment of the verifying system of the present invention.
Figure 5:
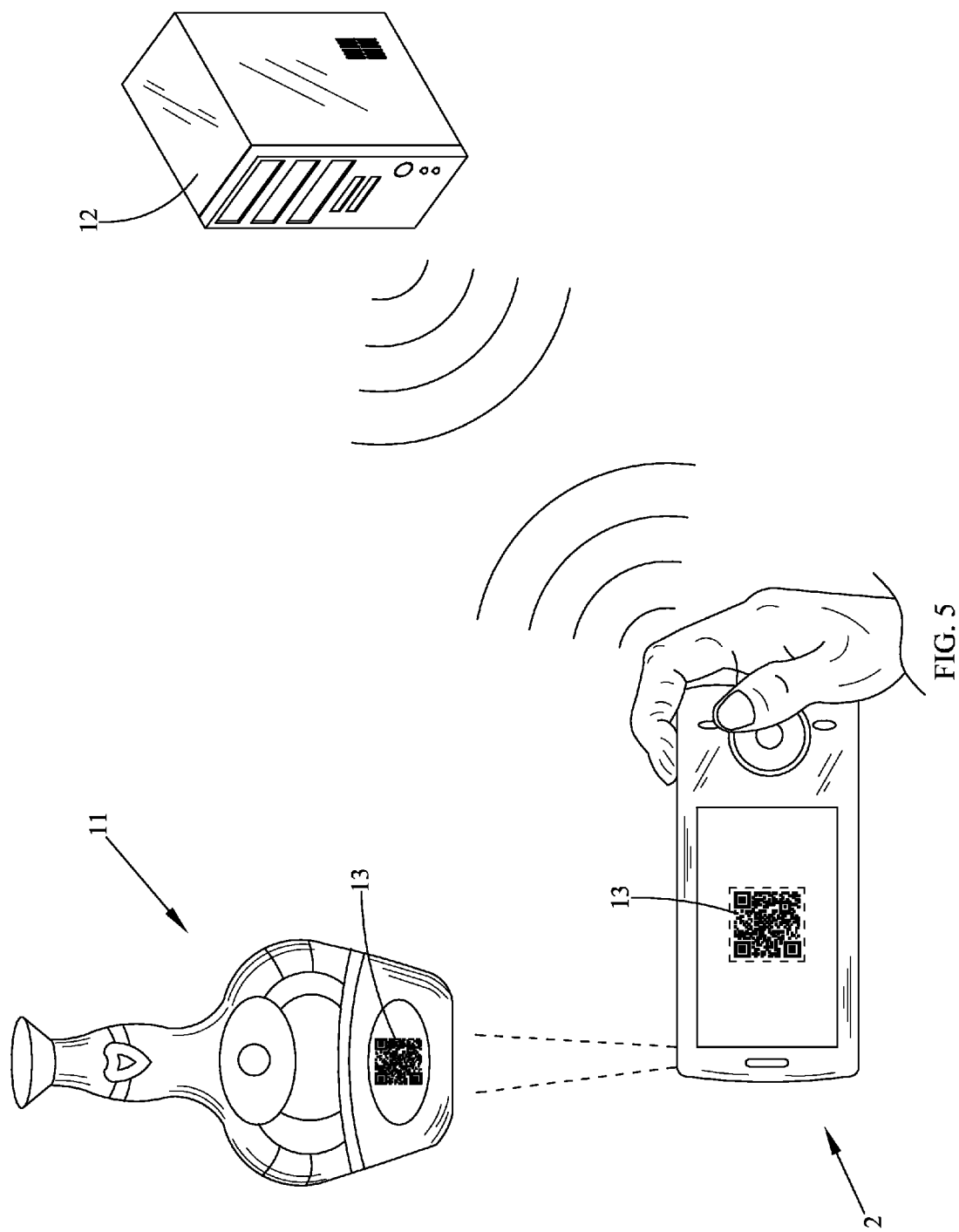
FIG. 5 is a fourth schematic diagram of the second exemplary embodiment of the verifying system of the present invention.

It is worth to mention that, the shielding layer 14 may be a transparent layer and a silver lacquer layer, such as the common scratch card type film in the market, in which the scratch card type film is formed by covering the transparent layer on the identifying code 13 and then covering the silver lacquer layer on the transparent layer, as shown in FIG. 4. Alternatively, the shielding layer 14 may be an opaque adhesive layer, such as sticker, attaching on the identifying code 13, so as to shield the identifying code 13, as shown in FIG. 3.

Additionally, the identifying code 13 may be generated by an identifying code generator, and disposed on the wine bottle by an attaching or printing manner, and then the wine bottle is shipped to the physical store or the online store. On the other hand, the supplier stores object information 1211 corresponding to the identifying code 13 to the database 121 of the verifying end 12. In the present exemplary embodiment, the identifying code 13 takes the quick response code for example. Incidentally, the supplier and the verifying end 12 may be the same unit or two collaborated units but not limited.

When the user utilizes the electronic device 2 to read or identify the identifying code 13, the electronic device 2 is connected to the verifying end 12 in accordance to the internet address identified from the identifying code 13, and then transmitting the identifying code 13 to the verifying end 12. It is worth mentioning that, the electronic device 2 may read or identify the identifying code 13 by the camera module with an identifying program (for example, QR code identifying program) without having to use a verifying program provided by the supplier or the verifying end 12 to read or identify the identifying code 13. The technique to read or identify the identifying code 13 by the electronic device 2 is well-known to those skilled in the art, the description is omitted herein.

Then, after the verifying end 12 compares the identifying code 13 with the object information 1211, the verifying end 12 generates verifying information 122 and transmits the verifying information 122 to the electronic device 2, so as to inform the users whether the product they brought was provided from the true supplier. Incidentally, the verifying information 122 may also include information of the object to be verified, such as the production date, expiration date, directions, originate and neutral facts, but not limited thereto, to provide a reference to the user. The verifying information 122 may further include a reporting link, such as phone number, message, email address or webpage and the identifying program provided by the supplier or verifying end, such that the user could directly select it and connect to a related interface or webpage for reporting. When the information provided by the verifying information 122 shows that the object to be verified was not provided by the true supplier, the user could reply reporting information through the reporting link, so as to provide reporting information (for example, store name that provided the counterfeit goods) to the verifying end in order to facilitate verifying end 12 of the subsequent tracing.

It is worth mentioning that, the identifying code 13 may include the encrypted information. When the electronic device 2 is connected to the verifying end 12, the verifying end 12 may rapidly and easily confirm that the identifying code 13 is provided by the verifying end 12 or the original supplier by the encrypted information. If the identifying code 13 is not provided by the verifying end 12 or the original supplier, the verifying end 12 directly generates the verifying information 122; otherwise, the verifying end 12 continues performing the follow-up comparison processes. The encrypted information may be formed by printing on the identifying code 13 with ink only reflecting invisible light, but not limited thereto.

Figure 6:
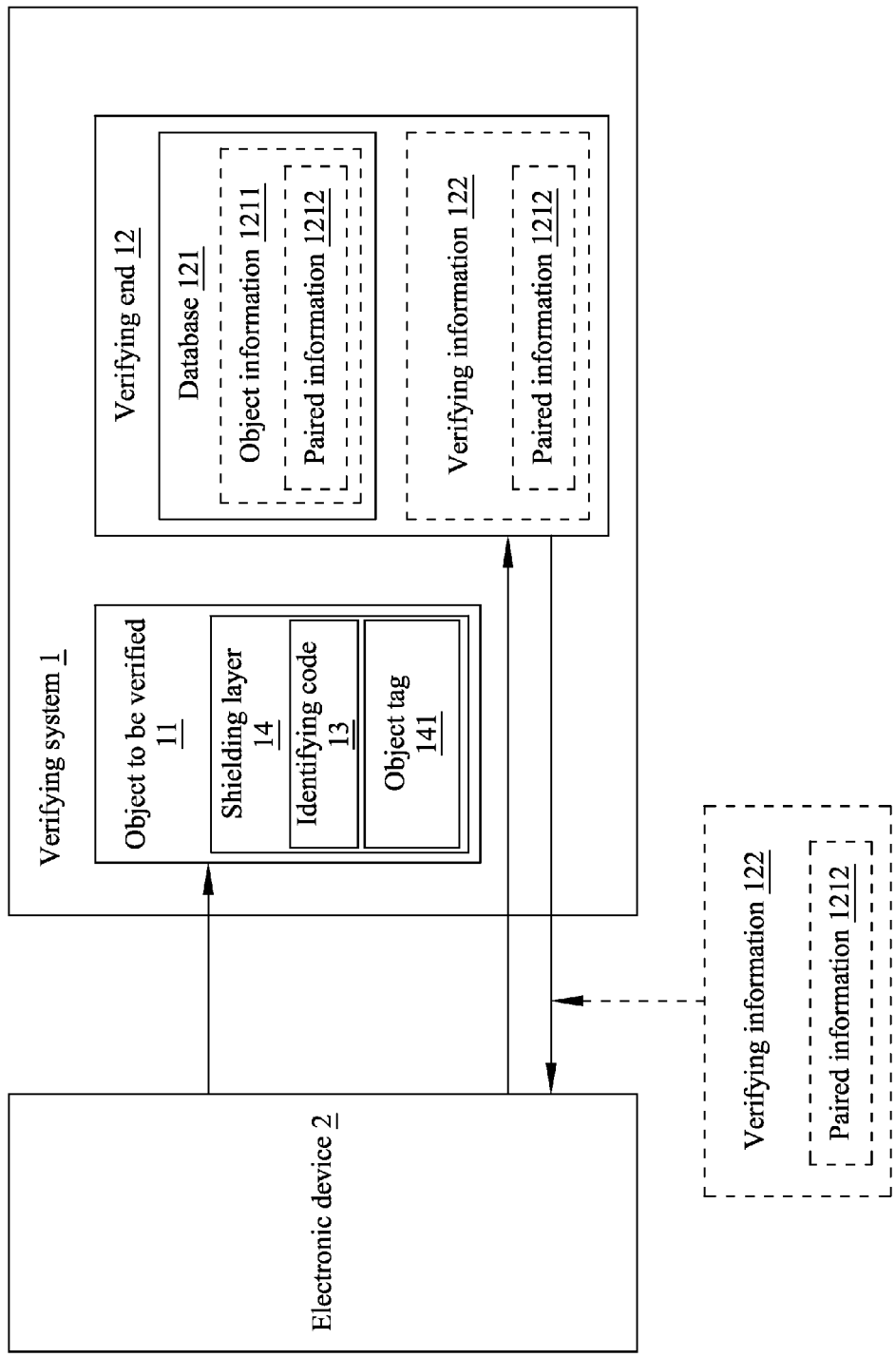
FIG. 6 is a block diagram of a third exemplary embodiment of the verifying system of the present invention.
Figure 7:
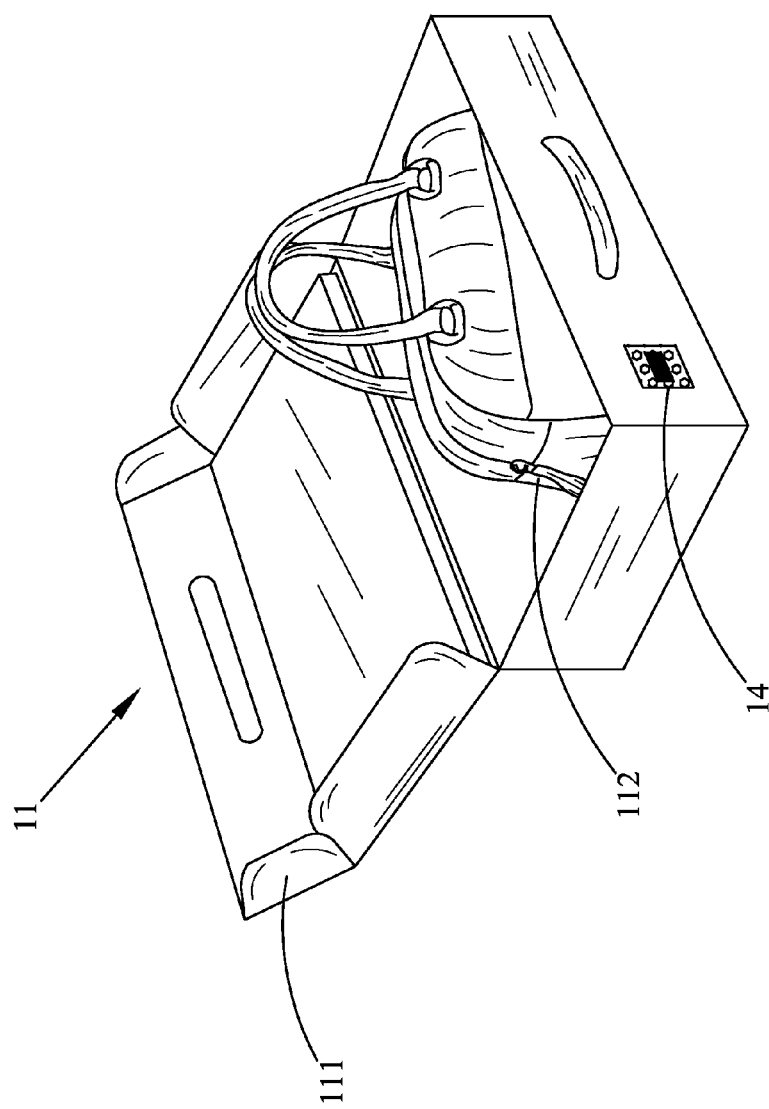
FIG. 7 is a first schematic diagram of the third exemplary embodiment of the verifying system of the present invention.
Figure 8:
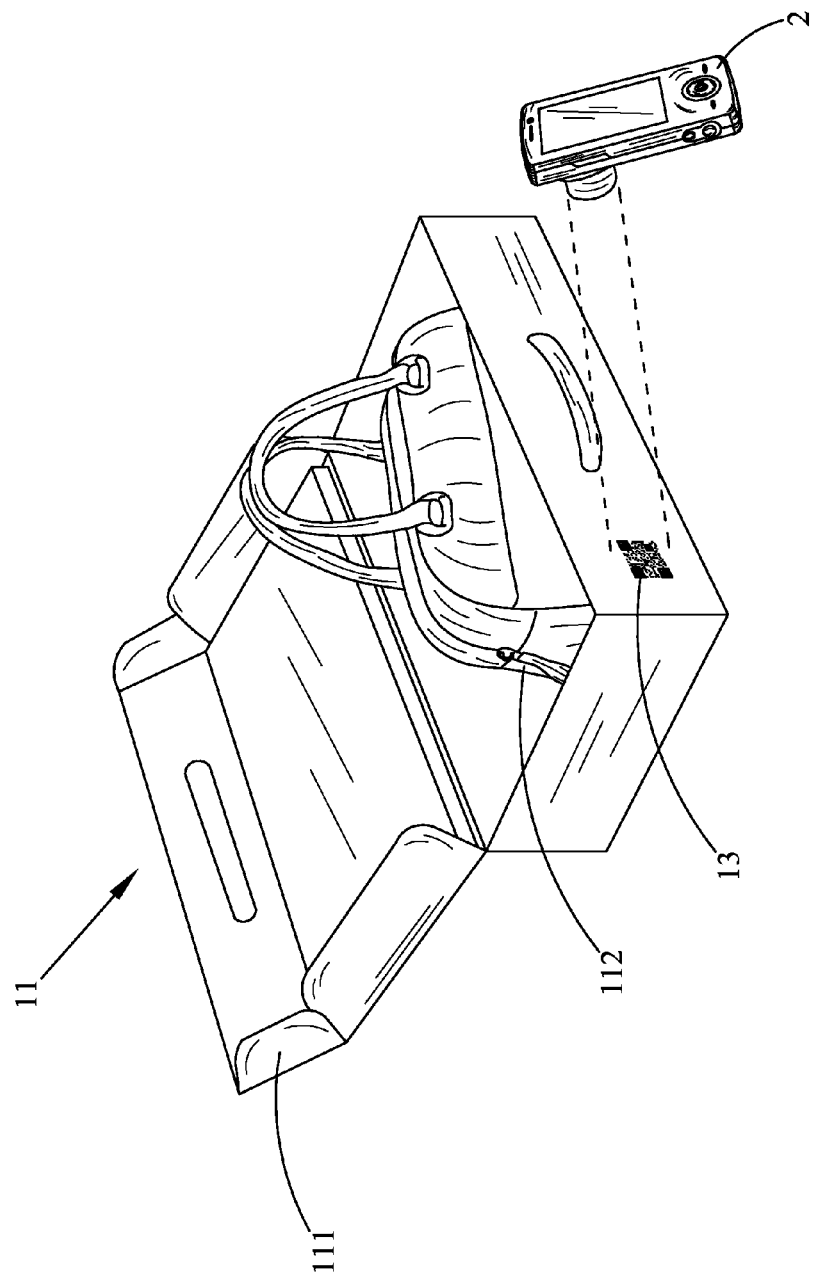
FIG. 8 is a second schematic diagram of the third exemplary embodiment of the verifying system of the present invention.

Referring FIGS. 6 to 8 for a block diagram, a first schematic diagram and a second schematic diagram of a third exemplary embodiment of the verifying system of the present invention. In the present exemplary embodiment, the relationship and the configuration resemble the above exemplar embodiments, the description is omitted herein.

In the present embodiment, the object to be verified 11 includes a packaging unit 111 and a body 112. The packaging unit 111 is configured to cover the body 112. The supplier or the verifying end 12 may dispose the identifying code 13 on an external surface of the packaging unit 111 and cover the shielding layer 14 on the identifying code 13.

After the user scrapes or tears down the shielding layer 14 to expose the identifying code 13, the user may use the electronic device 2 to read or identify the identifying code 13, and connect to the verifying end 14 in accordance to the identifying code 13. When the identifying code 13 is confirmed to be matching the object information 1211 by the verifying end 14, the verifying end 12 generates paired information 1212, and then stores the paired information 1212 in the object information 1211. If the identifying code 13 described above is read again, the verifying end 12 generates the verifying information 122 including the paired information 1212 in accordance to the paired information 1212 in the object information 1211, and then transmits the verifying information 122 to the electronic device 2 to provide to the user. In other words, after the user buys the object to be verified 11 and scrapes or tears down the shielding layer 14 on the external surface of the packaging unit 111 or on the body 112 and uses the electronic device 2 to read the identifying code 13, if the paired information 1212 as shown in the verifying information 122 feeding back to the electronic device 2, it means that the object to be verified 11 bought by the user is a counterfeit, and the identifying code 13 was copied from the identifying code 13 of the genuine good by the supplier.

Figure 9:
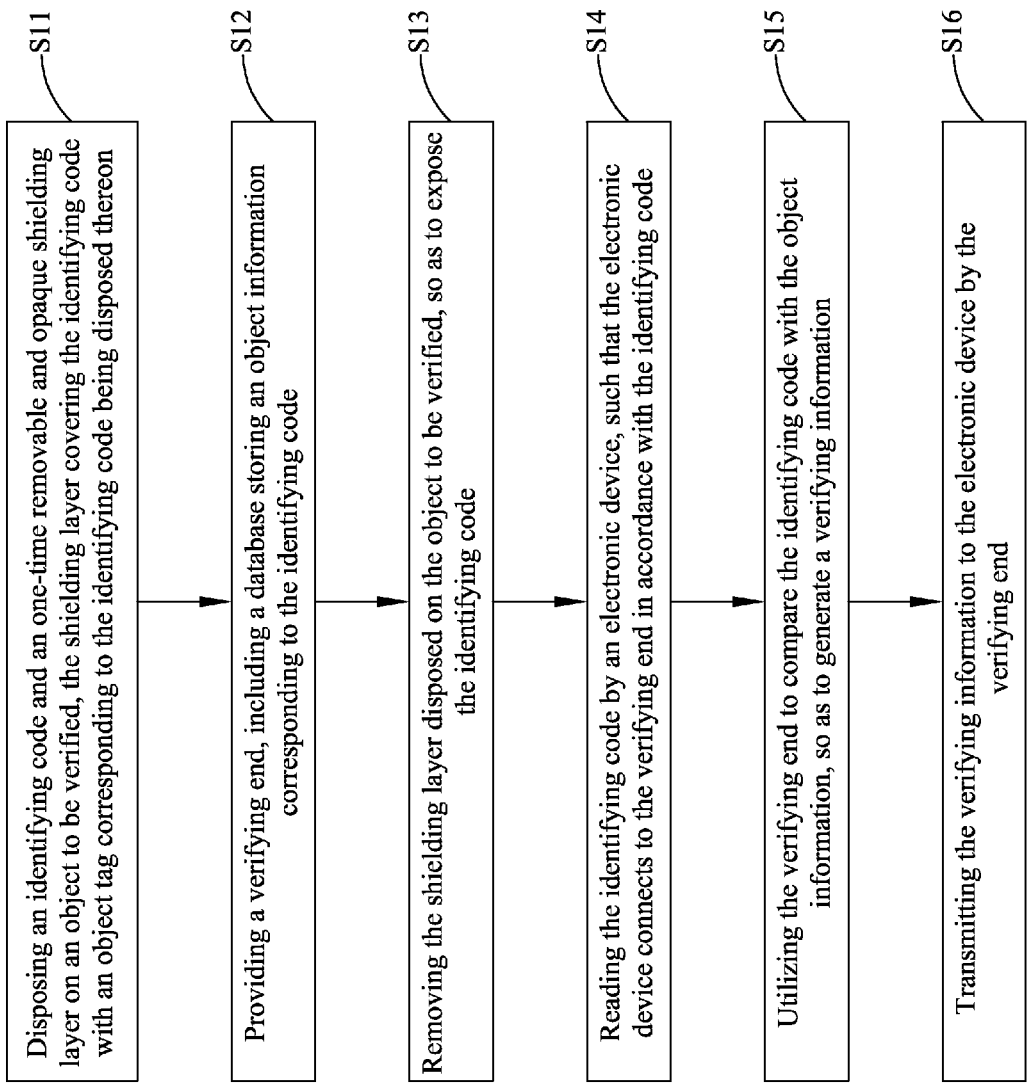
FIG. 9 is a flowchart of a verifying method of the present invention.

Refer FIG. 9 for a flowchart of a verifying method of the present invention. The verifying method is applicable to the verifying system. As shown in the flowchart, the verifying method comprises the following steps of:

step S11: disposing an identifying code and a one-time removable and opaque shielding layer on an object to be verified, the shielding layer covering the identifying code with an object tag corresponding to the identifying code being disposed thereon;

step S12: providing a verifying end, including a database storing an object information corresponding to the identifying code;

step S13: removing the shielding layer disposed on the object to be verified, so as to expose the identifying code;

step S14: reading the identifying code by an electronic device, such that the electronic device connects to the verifying end in accordance with the identifying code;

step S15: utilizing the verifying end to compare the identifying code with the object information, so as to generate a verifying information; and step S16: transmitting the verifying information to the electronic device by the verifying end.

The detail illustration of the verifying method of the present invention has been described above in company with the description of the verifying system of the present invention and would not repeat for the concise.

As set forth above, in the verifying system and the method thereof of the present invention, the identifying code is disposed on the external surface of the packaging unit or on the body of the object to be verified, and a one-time removable and opaque shielding layer is covered on the identifying code, so as to utilize the one-time removable characteristic of the shielding layer to prevent other manufacturer to copy the identifying code coved by the shielding layer and then cover the shielding layer back on the identifying code. Hence, if users use the electronic device to identify the identifying code and the paired information is shown in the verifying information, it means the object to be verified bought by the user is a counterfeit.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A verifying system, comprising:
    an object to be verified, including an identifying code covered with an one-time removable and opaque shielding layer, and an object tag disposed on the shielding layer, the object tag being corresponding to the identifying code; and
    a verifying end, including a database storing an object information corresponding to the identifying code;
    wherein, after the shielding layer is removed to expose the identifying code, and an electronic device is utilized to read the identifying code, the electronic device connects to the verifying end in accordance with the identifying code, so that the verifying end compares the identifying code with the object information, so as to generate a verifying information and transmit the verifying information to the electronic device;
    wherein the identifying code includes an encrypted information and an internet address, the electronic device recognizes the internet address from the identifying code, so as to connect to the verifying end in accordance with the internet address, and the verifying end determines whether to perform a comparison process on the object to be verified based on the encrypted information, and if so, the verifying end compares the identifying code with the object information, and then generates the verifying information, otherwise the verifying end generates the verifying information directly.

2. The verifying system of claim 1, wherein when the identifying code is matched to the object information, the verifying end further storing a paired information in the object information, and when the identifying code is read again, the verifying end generates the verifying information encompassing the paired information and transmits the verifying information to the electronic device.

3. The verifying system of claim 1, wherein the verifying information includes a reporting link, and after the electronic device receives the verifying information, the electronic device selectively transmits a reporting information to the verifying end in accordance with the reporting link.

4. The verifying system of claim 1, wherein the object to be verified further includes a packaging unit covering on a body of the object to be verified, the identifying code is disposed on an external surface of the packaging unit or on the body of the object to be verified.

5. A verifying method, comprising the following steps of:
    disposing an identifying code and an one-time removable and opaque shielding layer on an object to be verified, the shielding layer covering the identifying code with an object tag corresponding to the identifying code being disposed thereon;

providing a verifying end, including a database storing an object information corresponding to the identifying code;

removing the shielding layer disposed on the object to be verified, so as to expose the identifying code;

reading the identifying code by an electronic device, such that the electronic device connects to the verifying end in accordance with the identifying code;

utilizing the verifying end to compare the identifying code with the object information, so as to generate a verifying information; and transmitting the verifying information to the electronic device by the verifying end;

wherein the identifying code includes an internet address and an encrypted information, the method further comprising the following steps of:

recognizing the internet address from the identifying code by the electronic device to connect to the verifying end in accordance to the internet address; and determining whether to perform a comparison process on the object to be verified based on the encrypted information by the verifying end, and if so, the verifying end generates the verifying information after the verifying end compares the identifying code with the object information, otherwise the verifying end generates the verifying information directly.

6. The verifying method of claim 5, further comprising the following steps of:

utilizing the verifying end to confirm whether the identifying code matches the object information, and if so, the verifying end storing a paired information in the object information;

utilizing the verifying end to generate the verifying information encompassing the paired information when the identifying code is read again; and transmitting the verifying information to the electronic device by the verifying end.

7. The verifying method of claim 5, wherein the verifying information includes a reporting link, the method further comprising the following step of:

transmitting a reporting information selectively to the verifying end in accordance to the reporting link by the electronic device after the electronic device receives the verifying information.

8. The verifying method of claim 5, wherein the object to be verified further includes a packaging unit, the method further comprising the following steps of:

disposing the identifying code on an external surface of the packaging unit or on a body of the object to be verified; and covering the packaging unit on the body of the object to be verified.

* * * * *